(12) United States Patent
Lee

(10) Patent No.: US 7,941,349 B2
(45) Date of Patent: May 10, 2011

(54) METHOD OF PUBLISHING A TICKET ON DEMAND AND APPARATUS THEREOF

(75) Inventor: Kang Hean Lee, Incheon (KR)

(73) Assignee: Partners for Growth III, L.P., San Francisco, CA (US)

( * ) Notice: Subject to any disclaimer, the term of this patent is extended or adjusted under 35 U.S.C. 154(b) by 810 days.

(21) Appl. No.: 11/722,661

(22) PCT Filed: Dec. 22, 2005

(86) PCT No.: PCT/KR2005/004468
§ 371 (c)(1),
(2), (4) Date: Jun. 22, 2007

(87) PCT Pub. No.: WO2006/068437
PCT Pub. Date: Jun. 29, 2006

(65) Prior Publication Data
US 2009/0125407 A1 May 14, 2009

(30) Foreign Application Priority Data

Dec. 22, 2004 (KR) ........................ 10-2004-0110463

(51) Int. Cl.
*G06Q 30/00* (2006.01)
(52) U.S. Cl. ............ 705/26.5; 705/1; 705/26.1; 705/27; 235/380
(58) Field of Classification Search ............. 705/26, 705/27, 1; 235/380
See application file for complete search history.

(56) References Cited

U.S. PATENT DOCUMENTS

| | | | |
|---|---|---|---|
| 6,454,174 B1 * | 9/2002 | Sansone | 235/494 |
| 6,535,880 B1 * | 3/2003 | Musgrove et al. | 1/1 |
| 2002/0169623 A1 * | 11/2002 | Call et al. | 705/1 |
| 2003/0140017 A1 * | 7/2003 | Patton et al. | 705/410 |
| 2003/0160444 A1 * | 8/2003 | Durso | 283/77 |
| 2004/0099730 A1 * | 5/2004 | Tuchler et al. | 235/380 |

FOREIGN PATENT DOCUMENTS

| | | | |
|---|---|---|---|
| JP | 2002041498 A | * | 2/2002 |
| KR | 1020000006711 | | 2/2000 |
| KR | 1020000024506 | | 5/2000 |
| KR | 1020010000512 | | 1/2001 |
| KR | 1020010111250 | | 12/2001 |
| KR | 1020020011279 | | 2/2002 |

OTHER PUBLICATIONS

"Bank Cards Heed the Smart Card Call", Jason Fargo, Credit Card Management, Jan. 2001, pp. 25-29, [retrieved on Dec. 20, 2010].*

* cited by examiner

*Primary Examiner* — Yogesh C Garg
*Assistant Examiner* — Anne M Georgalas
(74) *Attorney, Agent, or Firm* — Sughrue Mion, PLLC

(57) ABSTRACT

The present invention relates to ticket-on-demand issuing method and apparatus capable of purchasing a predetermined performance ticket in advance over a communication network, such as the Internet, and of allowing a user to edit and manufacture the ticket. In the invention, the user purchases the performance ticket in advance, edits the design of the advance ticket in person, and stores the edited ticket. Then, the user is issued the edited ticket through a ticket issuing machine. According to the invention, it is possible for users who purchase, for example, movie, theater, and concert tickets in advance over a communication network, such as the Internet, to edit their own tickets in person and to be issued the edited tickets. Further, ticket purchasers can easily add their avatar images to their own tickets.

8 Claims, 15 Drawing Sheets

METHOD OF PUBLISHING A TICKET ON DEMAND AND APPARATUS THEREOF

TECHNICAL FIELD

The present invention relates to a method of publishing a ticket on demand and apparatus thereof, in which a predetermined performance ticket can be purchased in advance over a communication network, such as the Internet, and a user can edit and create an image on the ticket.

BACKGROUND ART

In recent years, the same types of tickets have been issued to persons who see the same movie, theater, or concert. That is, people who want to see, for example, the same movie are issued with the same type of tickets having the same image printed thereon, but with different information, such as show times and seat numbers. However, such conventional tickets cannot meet various preferences of ticket purchasers. That is, ticket purchasers generally want to have tickets having their own unique designs different from those of other people. In particular, when people attend to see specific performances on various occasions, such as wedding anniversaries and birthdays, or give entertainment tickets as gifts to other people for their anniversaries, they want to be issued with tickets having contents of their anniversaries printed thereon. However, the conventional method cannot meet these diverse preferences of purchasers.

DISCLOSURE OF INVENTION

Accordingly, it is an object of the invention to provide a method of issuing a ticket on demand and an apparatus for the same, in which ticket purchasers who purchase predetermined performance tickets can manufacture their own tickets and can be issued with the tickets.

Further, it is another object of the invention to provide a method of issuing a ticket on demand and a system for the same, in which a ticket-on-demand can be purchased in performance locations.

In order to solve the above-mentioned problems, according to an aspect of the invention, there is provided a method of issuing a ticket on demand by using a ticket-on-demand issuing server that is connected to a user's computer used for a user to purchase a performance ticket in advance and a service provider's computer used for a service provider to issue the ticket over a communication network including the Internet and that purchases the ticket in advance in response to a user's request. The ticket-on-demand issuing server performs the steps of: (a) receiving, from the service provider's computer, information on a ticket to be sold including at least one of a performance place, a performance time, a seat number, and price information of the performance to establish a for-sale ticket information database; (b) receiving image information of the ticket to be sold, dividing the image information into a plurality of images, and converting the divided images into items to establish a ticket image item database; (c) performing, when the user's computer accesses the ticket-on-demand issuing server over the communication network, user authentication, or when the user authentication fails, allowing the user to join therein as a member through a member joining procedure and permitting the access of the user's computer; (d) providing, to the user's computer, information on available tickets registered in the for-sale ticket information database and performing an advance reservation when the user's computer selects at least one of the available tickets; (e) reading out, when receiving a request to manufacture a ticket on demand from the user's computer, contents required for manufacturing the ticket on demand from the ticket image item database and providing the read contents to the user's computer; (f) receiving, from the user's computer, ticket-on-demand manufacturing information that is input to the user's computer by the user, creating image information of a ticket on demand corresponding to the ticket-on-demand manufacturing information, and storing the image information so as to be associated with user information or information related to the advance reservation; and (g) reading out, when a ticket issuing machine for issuing advance tickets requests the ticket-on-demand issuing server to transmit image information of the ticket on demand, the image information and providing the read image information to the ticket issuing machine.

Further, in the method of issuing a ticket on demand according to this aspect, preferably, in step (f), when receiving, from the user's computer, the ticket-on-demand manufacturing information including a request to add, to an image of the ticket on demand, a user image, which is a predetermined image that is stored in the user's computer by the user, the ticket-on-demand issuing server receives the user image from the user's computer to create image information of a ticket on demand corresponding to the ticket-on-demand manufacturing information, and stores it so as to be associated with the user information or the information related to the advance reservation.

Furthermore, in the method of issuing a ticket on demand according to this aspect, preferably, in step (b), when a predetermined ticket on demand is manufactured, the ticket-on-demand issuing server further establishes a ticket layout database by receiving ticket layout information in which a plurality of positions where images are printed on the ticket are previously set and by storing the information. In addition, preferably, the step (e) includes a step of reading out the ticket layout information from the ticket layout database and of providing the read information to the user's computer. Further, preferably, in step (f), the ticket-on-demand issuing server further receives, from the user's computer, information on the layout of a ticket on demand selected by the user from the ticket layout information to create image information of the ticket on demand so as to correspond to the layout of the ticket on demand.

Moreover, in the method of issuing a ticket on demand according to this aspect, preferably, in step (b), the ticket-on-demand issuing server further establishes a performance content item database by receiving, from the service provider's computer, performance contents including a pamphlet image of the performance, by dividing the pamphlet image into a plurality of images, by converting the divided images into items, and by storing the items. In addition, preferably, in step (e), the ticket-on-demand issuing server reads out performance content items related to the advance ticket from the performance content item database and provides the read items to the user's computer.

Further, in the method of issuing a ticket on demand according to this aspect, preferably, in the step (b), the ticket-on-demand issuing server further establishes a member content database by receiving, from the user's computer, a predetermined content stored in the user's computer and by storing the predetermined content. In addition, preferably, in the step (e), the ticket-on-demand issuing server reads out a predetermined content related to the user from the member content database and provides the read content to the user's computer.

Furthermore, in the method of issuing a ticket on demand according to this aspect, preferably, in the step (b), the ticket-on-demand issuing server further performs the steps of: (b1) receiving, from the user's computer, log-in information, including a user ID and a password, required for the user to log in a predetermined Internet site that provides an avatar service to the user who is a member of the Internet site; and (b2) transmitting the log-in information to an avatar server, which is a server for managing the Internet site, receiving, from the avatar server, an avatar image of the member, and storing the avatar image in the member content database. In addition, preferably, in the step (b2), the ticket-on-demand issuing server further performs the steps of: receiving, from the avatar server, a predetermined avatar image sold by the avatar server; providing the avatar image to the user's computer; receiving, from the user's computer, a user's request to purchase the avatar image and payment information required to purchase the avatar image; providing the information to the avatar server; and storing the avatar image in the member content database.

In order to solve the above-mentioned problems, according to another aspect of the invention, there is provided a ticket-on-demand issuing server that is connected to a user's computer used for a user to purchase a performance ticket in advance and a service provider's computer used for a service provider to issue the ticket over a communication network including the Internet and that purchases the ticket in advance in response to a user's request. The ticket-on-demand issuing server includes: a ticket information managing unit that receives, from the service provider's computer, information on a ticket to be sold including at least one of a performance place, a performance time, a seat number, and price information of the performance to establish a for-sale ticket information database; a content managing unit that receives image information of the ticket to be sold, divides the image information into a plurality of images, and converts the divided images into items to establish a ticket image item database; a member managing unit that, when the user's computer accesses the ticket-on-demand issuing server over the communication network, performs user authentication, and when the user authentication fails, allows the user to join therein as a member through a member joining procedure to permit the access of the user's computer; a ticket reserving unit that provides, to the user's computer, information on available tickets registered in the for-sale ticket information database and that, when the user's computer selects at least one of the available tickets, performs an advance reservation; a ticket-on-demand image creating unit that, when receiving a request to manufacture a ticket on demand from the user's computer, reads out contents required for manufacturing the ticket on demand from the ticket image item database and provides the read contents to the user's computer, and that, when receiving, from the user's computer, ticket-on-demand manufacturing information which is input to the user's computer by the user, creates image information of a ticket on demand corresponding to the ticket-on-demand manufacturing information, and stores the image information so as to be associated with user information or information related to the advance reservation; and a ticket-on-demand issuing unit that, when a ticket issuing machine for issuing advance tickets requests the ticket-on-demand issuing server to transmit image information of the ticket on demand, reads out the image information and provides the read image information to the ticket issuing machine.

Further, in the ticket-on-demand issuing server according to this aspect, preferably, when receiving, from the user's computer, the ticket-on-demand manufacturing information including a request to add, to an image of the ticket on demand, a user image, which is a predetermined image that is stored in the user's computer by the user, the ticket-on-demand image creating unit receives the user image from the user's computer to create image information of a ticket on demand corresponding to the ticket-on-demand manufacturing information, and stores it so as to be associated with the user information or the information related to the advance reservation.

Furthermore, in the ticket-on-demand issuing server according to this aspect, preferably, when a predetermined ticket on demand is manufactured, the content managing unit further establishes a ticket layout database by receiving ticket layout information in which a plurality of positions where images are printed on the ticket are previously set and by storing the information. In addition, preferably, the ticket-on-demand image creating unit reads out the ticket layout information from the ticket layout database and provides the read information to the user's computer. Further, preferably, the ticket-on-demand image creating unit further receives, from the user's computer, information on the layout of a ticket on demand selected by the user from the ticket layout information to create image information of the ticket on demand so as to correspond to the layout of the ticket on demand.

Moreover, in the ticket-on-demand issuing server according to this aspect, preferably, the content managing unit further establishes a performance content item database by receiving, from the service provider's computer, performance contents including a pamphlet image of the performance, by dividing the pamphlet image into a plurality of images, by converting the divided images into items, and by storing the items. In addition, preferably, the ticket-on-demand image creating unit reads out performance content items related to the advance ticket from the performance content item database and provides the read items to the user's computer.

Further, in the ticket-on-demand issuing server according to this aspect, preferably, the content managing unit further establishes a member content database by receiving, from the user's computer, a predetermined content stored in the user's computer and by storing the predetermined content. In addition, preferably, the ticket-on-demand image creating unit reads out a predetermined content related to the user from the member content database and provides the read content to the user's computer.

Furthermore, in the ticket-on-demand issuing server according to this aspect, preferably, the content managing unit receives, from the user's computer, log-in information, including a user ID and a password, required for the user to log in a predetermined Internet site that provides an avatar service to the user who is a member of the Internet site; transmits the log-in information to an avatar server, which is a server for managing the Internet site; receives, from the avatar server, an avatar image of the member; and stores the avatar image in the member content database.

Moreover, in the ticket-on-demand issuing server according to this aspect, preferably, the content managing unit further performs the steps of: receiving, from the user's computer, log-in information, including a user ID and a password, required for the user to log in a predetermined Internet site that provides an avatar service to the user who is a member of the Internet site; transmitting the log-in information to an avatar server, which is a server for managing the Internet site; receiving, from the avatar server, a predetermined avatar image sold by the avatar server; providing the avatar image to the user's computer; receiving, from the user's computer, a user's request to purchase the avatar image and payment information required for purchasing the avatar image; providing the information to the avatar server; and storing the avatar image in the member content database.

In order to solve the above-mentioned problems, according to still another aspect of the invention, there is provided a method of issuing a ticket on demand by using a predetermined ticket issuing machine in a performance place. The method includes the steps of: (a) causing a ticket-on-demand issuing server for managing ticket issuing information to receive, from a computer of a service provider who manages the performance, information on a ticket to be sold including at least one of a performance place, a performance time, a seat number, and price information of the performance to establish a ticket issuing information database, and to further establish a performance content database by receiving an image related to the performance, by dividing the image into a plurality of images, by converting the divided images into items, and by storing the items; (b) causing the ticket issuing machine to request the ticket-on-demand issuing server to transmit information on issuable tickets when a predetermined ticket purchaser inputs a ticket-on-demand issuing request to the ticket issuing machine, and causing the ticket-on-demand issuing server to read out the information on issuable tickets from the ticket issuing information database; (c) causing the ticket issuing machine to receive the information on issuable tickets from the ticket-on-demand issuing server to output it, and, when the ticket purchaser selects one of the issuable tickets, causing the ticket issuing machine to transmit information of the selected ticket to the ticket-on-demand issuing server; (d) causing the ticket-on-demand issuing server to read out performance contents related to the selected ticket from the performance content database and to transmit them to the ticket issuing machine; and (e) causing the ticket issuing machine to edit a ticket on demand, on the basis of performance information of the selected ticket and the performance contents, and to issue the edited ticket.

Further, in the method of issuing a ticket on demand according to this aspect, preferably, the step (a) further includes a step of causing the ticket-on-demand issuing server to allow a predetermined user to join therein as a member, to register the member, to receive an image of the member, to store the image, and to establish a member content database. In addition, preferably, in the step (c), the ticket issuing machine receives a member ID and a password from the ticket purchaser and transmits them to the ticket-on-demand issuing server. Preferably, in the step (d), the ticket-on-demand issuing server performs member authentication by comparing the received member ID and password with the member ID and password previously stored therein, and when the member authentication succeeds, reads out a predetermined member content corresponding to the member ID from the member content database to transmit the member content to the ticket issuing machine. Further, preferably, in the step (e), the ticket issuing machine edits a ticket on demand, on the basis of the performance information of the selected ticket, the performance contents, and the member content, and issues the edited ticket.

Furthermore, in the method of issuing a ticket on demand according to this aspect, preferably, in the step (c), the ticket issuing machine further receives information of another Internet site, a member ID and a password from the ticket purchaser and transmits them to the ticket-on-demand issuing server. Preferably, in the step (d), the ticket-on-demand issuing server transmits the member ID and the password to a server of another Internet site, requests the server to transmit contents corresponding to the member ID, receives the contents stored in the Internet site from the server thereof, and transmits the contents to the ticket issuing machine. Preferably, in the step (e), the ticket issuing machine edits a ticket on demand, on the basis of performance information of the selected ticket, the performance contents, and the contents of another Internet site, and issues the edited ticket.

In order to solve the above-mentioned problems, according to yet another aspect of the invention, there is provided a ticket-on-demand issuing system that issues a predetermined performance ticket in a perform place by using a ticket issuing machine. The ticket-on-demand issuing system includes: a ticket-on-demand issuing server that receive, from a computer of a service provider who manages the performance, information on a ticket to be sold including at least one of a performance place, a performance time, a seat number, and price information of the performance to establish a ticket issuing information database, further establishes a performance content database by receiving an image related to the performance, by dividing the image into a plurality of images, by converting the divided images into items, and by storing the items, reads out the ticket information or performance contents according to the request of the ticket issuing machine, and provides them to the ticket issuing machine; a ticket selecting unit that, when a predetermined ticket purchaser inputs a ticket-on-demand issuing request, requests the ticket-on-demand issuing server to transmit information on issuable tickets, receives the information on issuable tickets from the ticket-on-demand issuing server, and outputs the information so that the ticket purchaser selects one of the issuable tickets; a performance content receiving unit that receives information on the selected ticket from the ticket selecting unit, requests the ticket-on-demand issuing server to transmit performance contents related to the selected ticket, and receives the performance contents therefrom; and a ticket issuing machine that receives performance information on the selected ticket and the performance contents from the ticket selecting unit and the performance content receiving unit, respectively, edits a ticket on demand on the basis of the received information, and issues the edited ticket.

Further, in the ticket-on-demand issuing system according to this aspect, preferably, the ticket-on-demand issuing server further establishes a member content database by allowing a predetermined user to join therein as a member, by registering the member, by receiving a predetermined image content of the member, and by storing the image content, and provides the member contents according to the request of the ticket issuing machine. Preferably, the performance content receiving unit of the ticket issuing machine receives a member ID and a password from the ticket purchaser, transmits them to the ticket-on-demand issuing server, and receives contents corresponding to the member ID. In addition, preferably, a ticket issuing unit of the ticket issuing machine receives the performance information of the selected ticket, and the performance contents and the member contents from the ticket selecting unit and the performance content receiving unit, respectively, edits a ticket on demand on the basis of the received information, and issues the edited ticket.

Furthermore, in the ticket-on-demand issuing system according to this aspect, preferably, a performance content receiving unit of the ticket issuing machine receives information of another Internet site, a member ID and a password from the ticket purchaser, and transmits them to the ticket-on-demand issuing server. Preferably, the ticket-on-demand issuing server transmits the member ID and the password to a server of another Internet site, requests the server to transmit contents corresponding to the member ID, receives the contents stored in the Internet site from the server thereof, and transmits the contents to the ticket issuing machine. In addition, preferably, a ticket issuing unit of the ticket issuing machine receives the performance information of the selected ticket, and the performance contents and the contents of another Internet site from the ticket selecting unit and the performance content receiving unit, respectively, edits a ticket on demand on the basis of the received information, and issues the edited ticket.

BEST MODE FOR CARRYING OUT THE INVENTION

Figure 1:
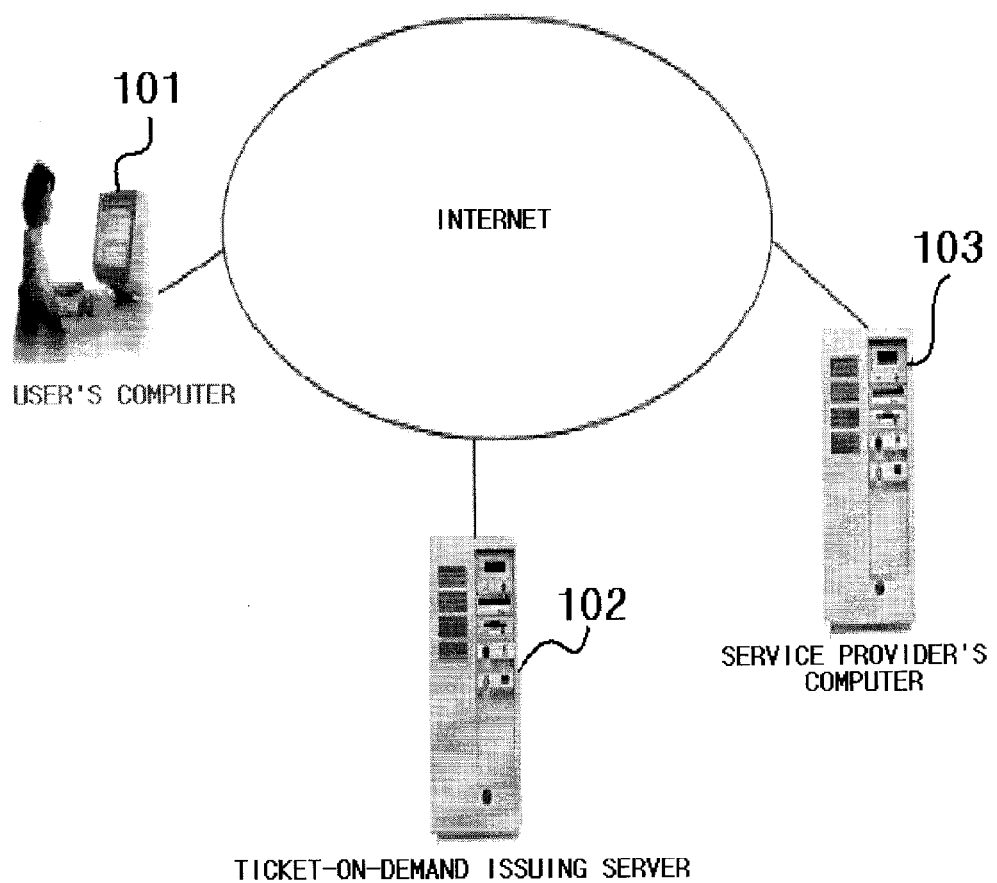
FIG. 1 is a diagram illustrating the overall structure of a system for issuing a ticket on demand according to an embodiment of the invention.

Hereinafter, preferred embodiments of the invention will be described with reference to the accompanying drawings. FIG. 1 is a diagram illustrating the overall structure of a system for issuing a ticket on demand. In FIG. 1, reference numeral 101 denotes a user's computer, and a user uses his or her own computer connected to a ticket-on-demand issuing server 102 over the Internet to purchase, for example, a movie, theater, or concert ticket in advance and to edit the advance ticket.

Further, the ticket-on-demand issuing server 102 functions to sell performance tickets to users and allows the users to edit their own advance tickets.

Reference numeral 103 denotes a service provider's computer, and the service provider's computer functions to provide information on tickets to be sold and content of image information, such as theatrical or movie pamphlets related to the tickets, to the ticket-on-demand issuing server.

Figure 2:
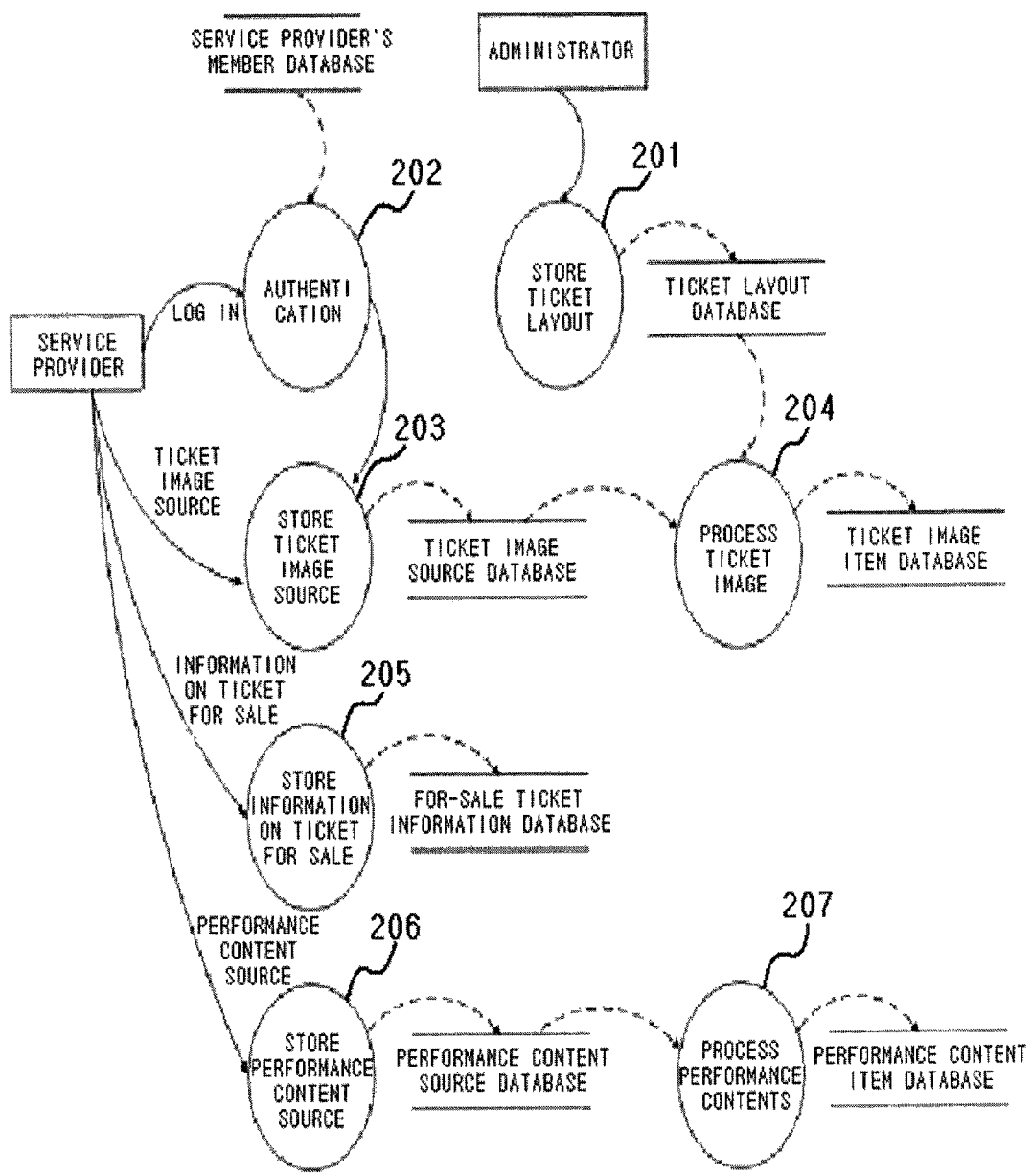
FIG. 2 is a diagram illustrating the flow of data when content is received from a service provider in a method of issuing a ticket on demand according to the invention.

FIG. 2 is a diagram illustrating the flow of data when content is received from a service provider in a method of issuing a ticket on demand according to the invention. For reference, data processing steps 201 and 207 are all performed in the ticket-on-demand issuing server 102.

First, the ticket-on-demand issuing server receives ticket layout information related to a theatrical or movie ticket issuing type from an administrator and then stores the information in a ticket layout database (DB) 201. Here, the term 'ticket layout' means to prescribe how to arrange a region having contents indispensable for the ticket (for example, bar codes and the title of a performance) and contents that the user wants to put in the ticket. For example, in the case of a vertical layout, bar codes, the title of a performance, and a content image selected by the user may be arranged in this order from the upper part of the ticket.

Thereafter, when a person concerned in the performance logs in the ticket-on-demand issuing server through the service provider's computer, the ticket-on-demand issuing server performs authentication (202) and permits access. Then, the ticket-on-demand issuing server receives source images of tickets to be sold from the service provider's computer and stores the source images (203). Subsequently, the ticket-on-demand issuing server receives information of tickets to be sold and stores the information (205). Then, the ticket-on-demand issuing server receives source contents of a performance and stores the source contents (206).

Here, the term 'source image of ticket' means an original ticket image before its design is edited by the user. In addition, the term 'information of ticket to be sold' means information on, for example, the date and time of a performance, seat numbers, the title of a performance, and an admission fee. The term 'source contents of performance' means contents related to the performance that is provided for the user to edit the image of the ticket. For example, the pamphlet image of the performance typically corresponds to the source contents.

Thereafter, the ticket-on-demand issuing server processes the stored source image of the ticket to create a ticket image item, and stores the ticket image item (204). Also, the ticket-on-demand issuing server processes the source contents of the performance to create an item, and stores it (207). Here, the term 'creating an item' means to divide a source image in a predetermined size or to classify it according to its theme so that the user can combine the divided image with his or her advance ticket. For example, when images of a soldier, a helmet, a rifle, and an actor are displayed on a scene of a movie that is provided as the source contents of the performance, the images can be separately divided and stored.

Figure 3:
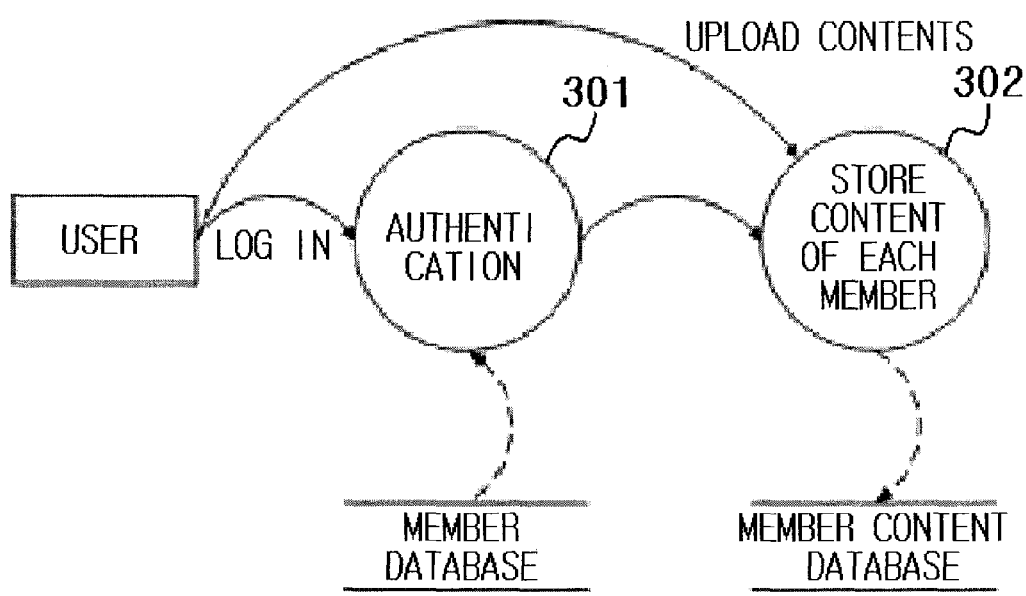
FIG. 3 is a diagram illustrating the flow of data when content is received from a user in the method of issuing a ticket on demand according to the invention.

FIG. 3 is a diagram illustrating the flow of data when contents are received from the user in the method of issuing a ticket on demand according to the invention. All processes shown in FIG. 3 are performed in the ticket-on-demand issuing server.

When receiving a log-in request from the user, the ticket-on-demand issuing server performs authentication (301) and permits the access of the user. Then, the ticket-on-demand issuing server receives the contents (images) stored in the user's computer from the user and stores the contents (302). That is, the ticket-on-demand issuing server receives the images from the user's computer, classifies images according to members, and stores the classified images.

Figure 4:
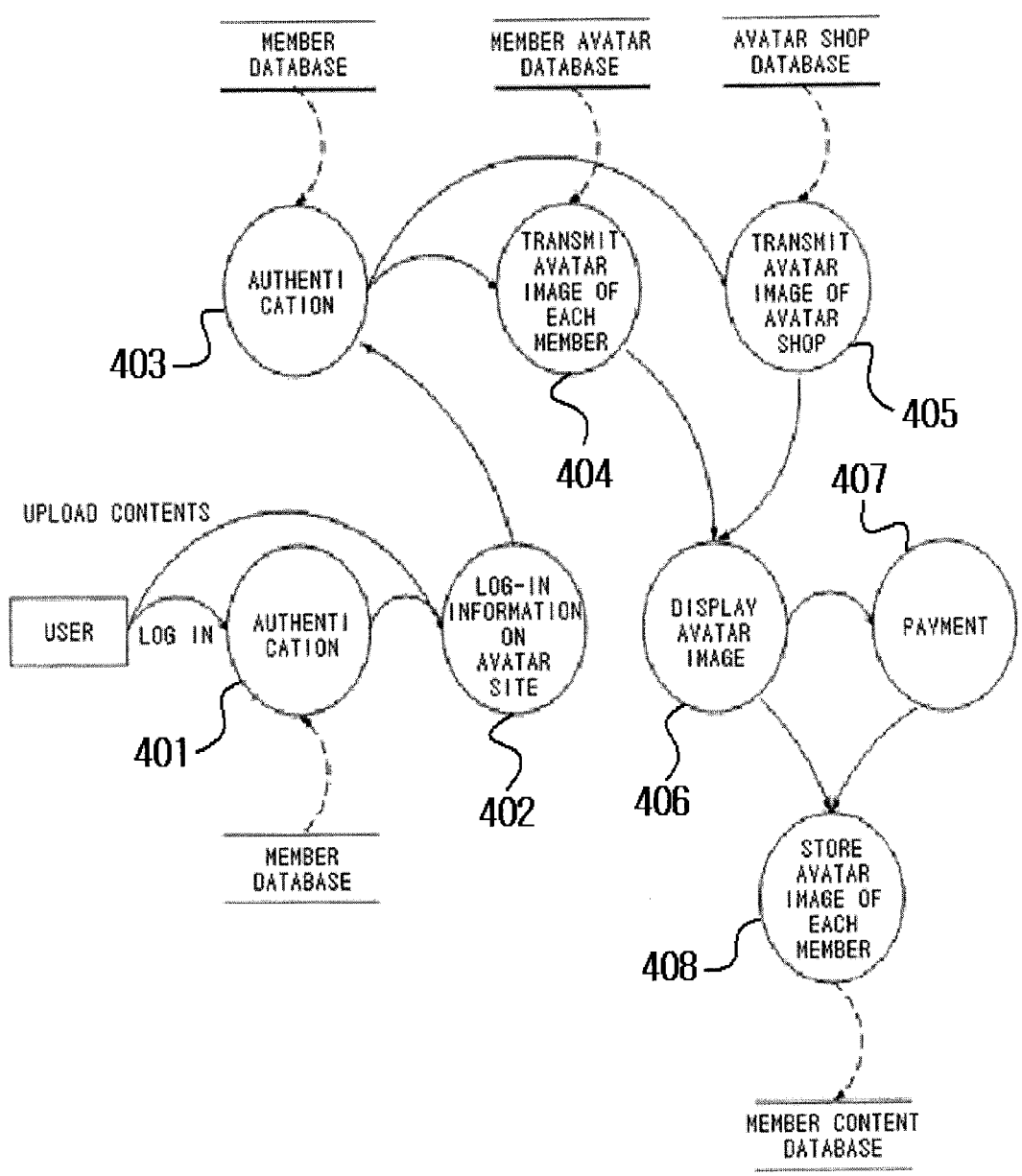
FIG. 4 is a diagram illustrating the flow of data when avatar content is received in the method of issuing a ticket on demand according to the invention.

FIG. 4 is a diagram illustrating the flow of data when avatar contents are received in the method of issuing a ticket on demand according to the invention. The invention provides a method of allowing the user to edit a performance ticket using an avatar image provided from another Internet site. Processes 403, 404, and 405 shown in FIG. 4 are performed in another Internet site that provides an avatar service, and the remaining processes 401, 402, 406, 407, and 408 are performed in the ticket-on-demand issuing server according to the invention.

First, when a user logs in the ticket-on-demand issuing server through his own computer, the ticket-on-demand issuing server performs authentication (401). Then, the ticket-on-demand issuing server receives log-in information of the user from an Internet site that has the user as a member and provides the avatar service (402), and accesses the Internet site that provides the avatar service, on the basis of the log-in information of the user.

Then, the Internet site that provides the avatar service authenticates information of the user, corresponding to the operation of the ticket-on-demand issuing server, and reads out the avatar image of the user to transmit it to the ticket-on-demand issuing server (404). The ticket-on-demand issuing server displays the avatar image, and stores the avatar image of each member after user's confirmation (408).

Meanwhile, after the process 403, when the Internet site that provides the avatar service transmits avatar items in an avatar shop that are sold in the Internet site in response to a user's request (405), the ticket-on-demand issuing server displays the transmitted avatar items (406). When the user wants to purchase one of the displayed avatar items, the ticket-on-demand issuing server performs a payment process (407) and then stores the avatar image of each member so as to be associated with user's information (408).

Figure 5:
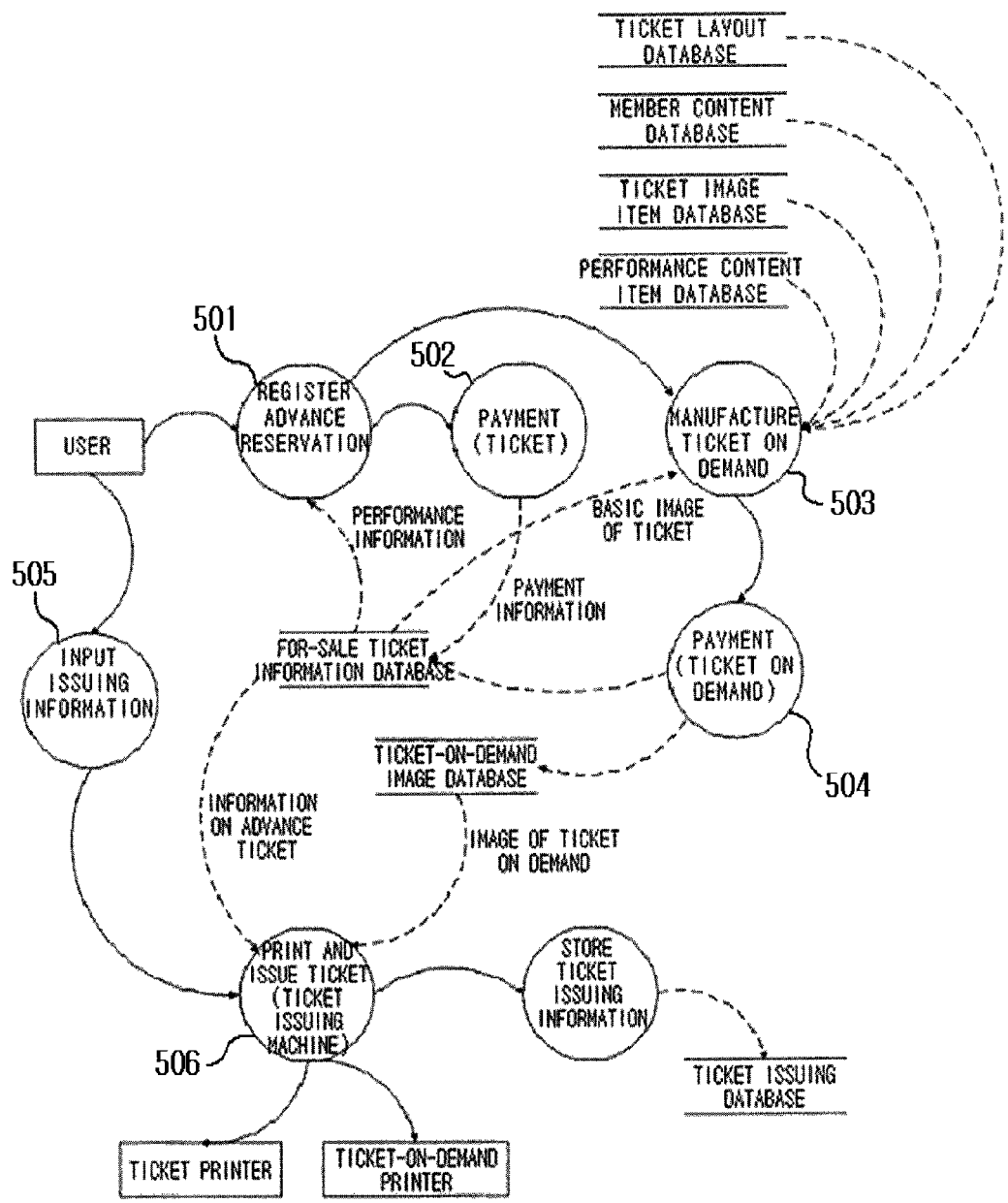
FIG. 5 is a diagram illustrating the overall flow of data in the method of issuing a ticket on demand according to the invention.

FIG. 5 is a diagram illustrating the flow of data in the method of issuing a ticket on demand according to the invention. In FIG. 5, processes 501 to 504 are performed in the ticket-on-demand issuing server, and processes 505 and 506 are performed in a ticket issuing machine which issues predetermined tickets.

First, when the user registers an advance ticket to the ticket-on-demand issuing server (501), and the ticket-on-demand issuing server performs a payment process on the ticket registered in advance (502). Then, the ticket-on-demand issuing server edits the advance ticket to manufacture a ticket on demand (503) in response to a user's request. At that time, the ticket-on-demand issuing server supplies, to the user, the layout of the ticket, individual contents of the user, a ticket image item obtained by processing a ticket image, and a performance content item obtained by processing the contents of the performance. Then, the user manufactures a ticket on demand by using the supplied data.

Thereafter, when the user inputs information on the advance ticket to the ticket issuing machine for issuing tickets (505), the ticket issuing machine receives the image of the manufactured ticket on demand from the ticket-on-demand issuing server and prints it by using a ticket-on-demand printer (506). When the user selects a conventional ticket issuing mode other than the ticket-on-demand issuing mode, issuing may be performed by using a ticket printer.

Figure 6:
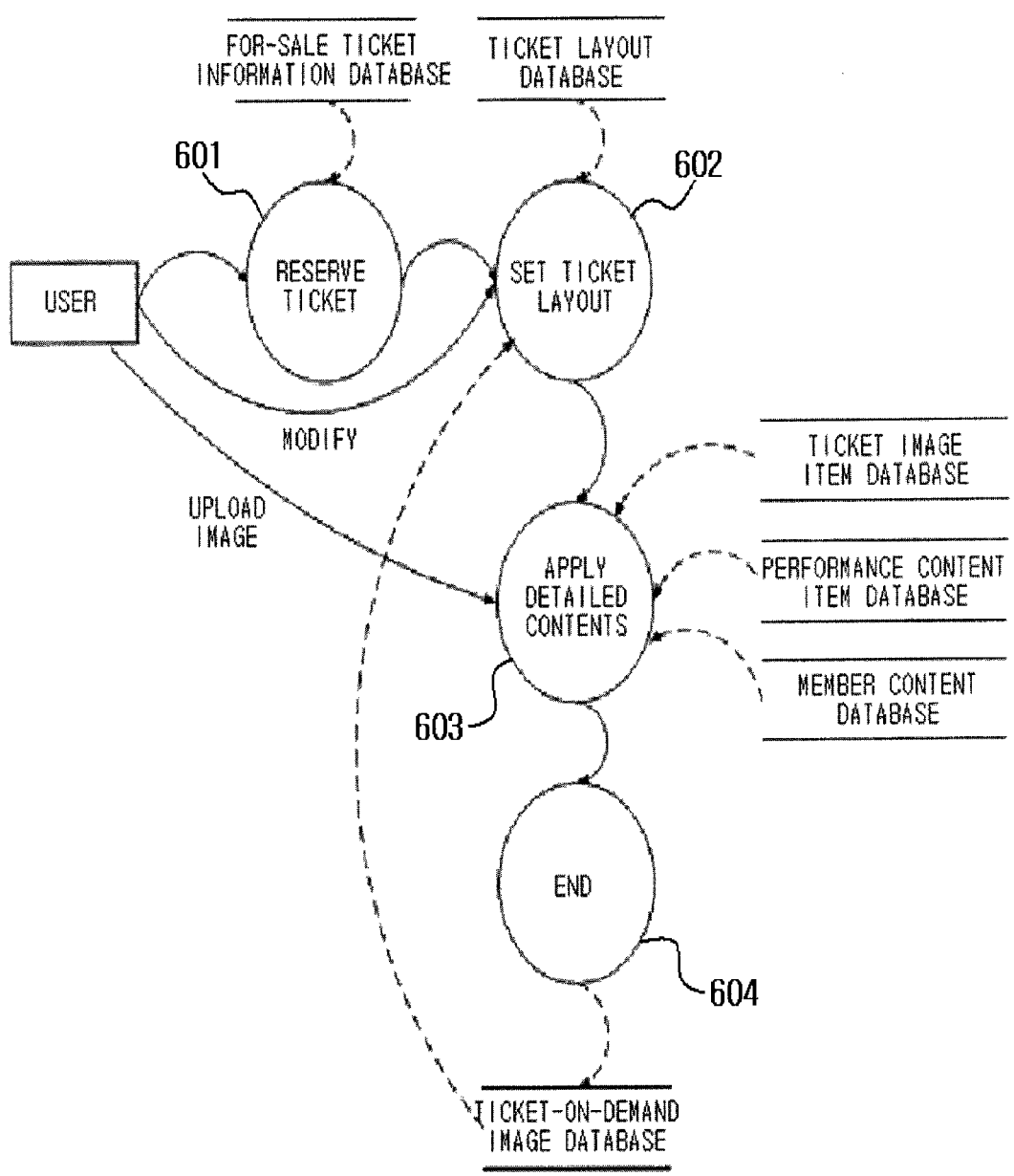
FIG. 6 is a diagram illustrating the flow of data when the user manufactures a ticket on demand in the method of issuing a ticket on demand according to the invention.

FIG. 6 is a diagram illustrating the flow of data in a process for the user to manufacture a ticket on demand of the method of issuing a ticket on demand. FIG. 6 shows the process 503 (for manufacturing a ticket on demand) shown in FIG. 5 in more detail. First, when the user requests ticket reservation, the ticket-on-demand issuing server performs a ticket reservation process (601), and provides information items on the ticket layout to the user. Then, when the user selects one of the information items, the ticket-on-demand issuing server sets the selected information item (602). Subsequently, when the user designates an image to be inserted along the set layout, the ticket-on-demand issuing server applies detailed contents thereon (603), and stores the image (604). If the user wants to modify the manufactured ticket on demand, the process 602 is performed to modify the ticket on demand.

Figure 7:
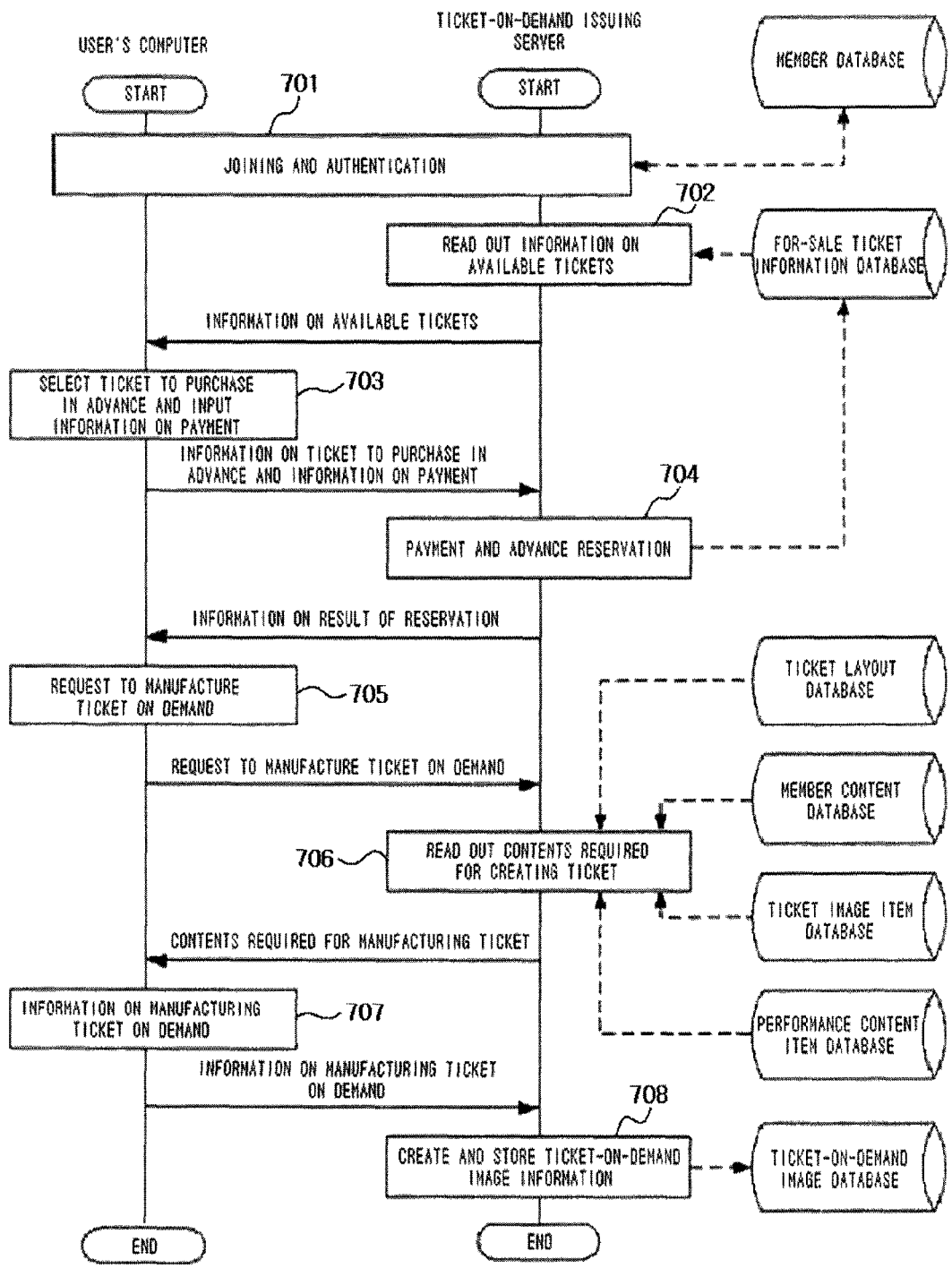
FIG. 7 is a flow chart illustrating a preferred example of a method of manufacturing a ticket on demand according to the invention.

FIG. 7 is a flow chart illustrating a preferred example of a method of manufacturing a ticket on demand. First, when the user accesses the ticket-on-demand issuing server through his or her computer, subscription and authentication processes are performed (701). When the user accesses the ticket-on-demand issuing server, the ticket-on-demand issuing server reads out information on advance available tickets, and transmits the information to the user's computer. Then, the ticket-on-demand issuing server receives information on the selection of an advance ticket input to the user's computer by the user and information on a paying means (703), performs ticket reservation and payment processes (704), and transmits the processed results to the user's computer.

The user's computer receives, from the user, a request to edit the design of the advance ticket to manufacture a ticket on demand, and provides the request to the ticket-on-demand issuing server. Then, the ticket-on-demand issuing server reads out contents required for manufacturing the ticket (706), and provides the read contents to the user's computer. Here, the contents required for manufacturing the ticket may include information on the layout of a ticket to be manufactured, content of each member (user), contents obtained by changing the original ticket image into an item, and contents obtained by changing performance contents corresponding to the ticket into an item.

When the user inputs ticket-on-demand manufacturing information into the user's computer (707), the user's computer provides the information to the ticket-on-demand issuing server. At that time, the user's computer can request the ticket-on-demand issuing server to add the above-mentioned contents to the ticket, while providing arbitrary contents stored therein to the ticket-on-demand issuing server.

The ticket-on-demand issuing server creates the image information of the ticket on demand and stores the created information (708).

Figure 8:
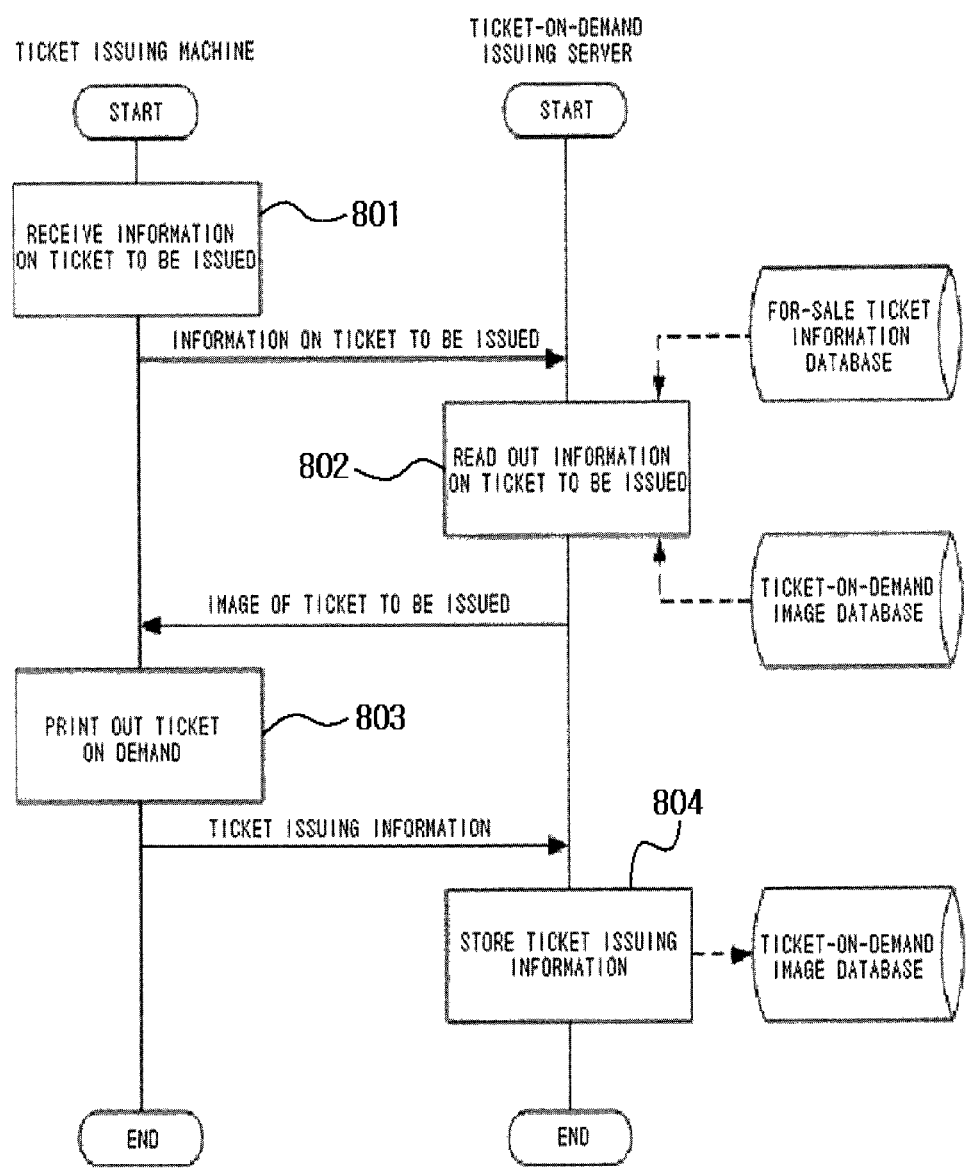
FIG. 8 is a flow chart illustrating a preferred example of the method of issuing a ticket on demand according to the invention.

FIG. 8 is a flow chart illustrating a preferred example of the method of issuing a ticket on demand according to the invention. When the user inputs issue information, which is information on the advance ticket, to the ticket issuing machine (801), the ticket issuing machine provides the input information to the ticket-on-demand issuing server. Then, the ticket-on-demand issuing server reads out information on a ticket to be issued on the basis of the issue information (802) and provides the ticket information to the ticket issuing machine. The ticket issuing machine prints out a ticket on demand to the user, on the basis of the provided ticket information (803). Thereafter, when receiving information on ticket issue, the ticket-on-demand issuing server stores the information (804).

Figure 9:
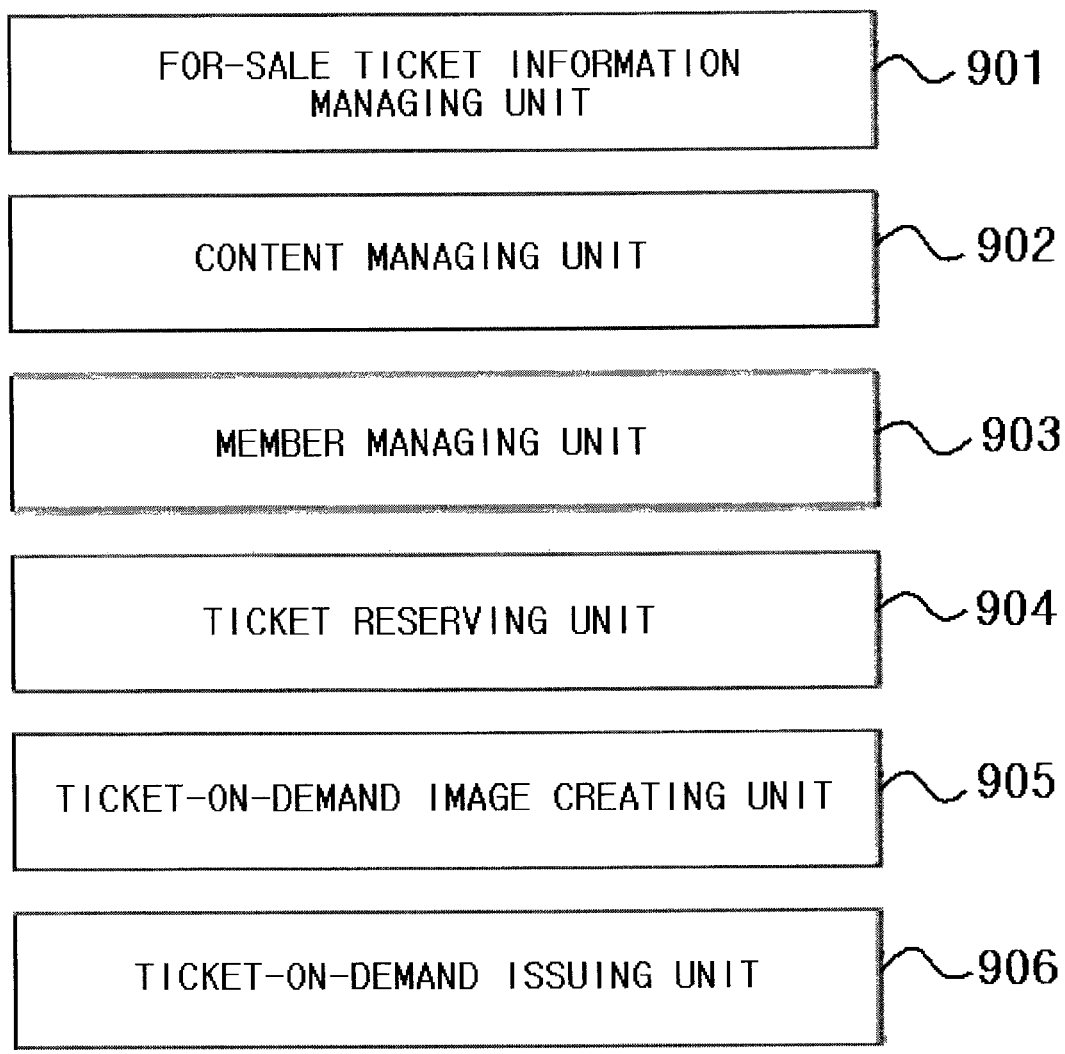
FIG. 9 is a block diagram illustrating a preferred example of a ticket-on-demand issuing server according to the invention.

FIG. 9 is a block diagram illustrating a preferred example of the ticket-on-demand issuing server according to the invention.

A for-sale ticket information managing unit 901 receives, from the service provider's computer, information on a ticket to be sold which includes at least one of information about where the performance is played, performance times, seat numbers, and information on the ticket price, and establishes a for-sale ticket information database.

A content managing unit 902 receives image information of the tickets for sale to convert the image information into a plurality of divided image items, and establishes a ticket image item database.

Further, when a predetermined ticket on demand is manufactured, the content managing unit may further establish a ticket layout database by receiving information on a ticket layout in which a plurality of positions where images are printed on the ticket are previously set and by storing the information.

Furthermore, the content managing unit may further establish a performance content item database by receiving performance contents including the pamphlet image of the performance from the service provider's computer, by dividing the image into a plurality of images, by converting the images into items, and by storing the items.

Moreover, the content managing unit may further establish a member content database by receiving, from the user's computer, a predetermined content stored therein and by storing the content.

Further, the content managing unit may perform a function of receiving, from the user's computer, user's log-in information, including a password and ID, required for logging-in an Internet site that provides an avatar service to the user, of transmitting the log-in information to an avatar server that manages the Internet site, of receiving an avatar image of the user from the avatar server, and of storing the avatar image in the member content database. Further, the content managing unit may perform a function of receiving, from the avatar server, a predetermined avatar image which is sold by the avatar server, of providing the avatar image to the user's computer, of receiving user's decision to purchase the avatar image and payment information required for purchasing the avatar image from the user's computer, of providing the information to the avatar server, and of storing the avatar image in the member content database.

When the user's computer accesses the ticket-on-demand issuing server over the network, a member managing unit 903 performs user authentication. As a result of authentication, when the user authentication fails, the member managing unit 903 allows the user to join therein as a member through a joining procedure. When the user is registered as a member, the member managing unit 903 permits the access of the user's computer.

A ticket reserving unit 904 provides information items on advance available tickets registered in the for-sale ticket information database to the user's computer. When the user's computer selects at least one of the advance available tickets, the ticket reserving unit performs advance reservation.

When the user's computer requests to manufacture a ticket on demand, a ticket-on-demand image creating unit 905 reads out the content required for manufacturing the ticket on demand from the ticket image item database, and provides the read content to the user's computer. When receiving, from the user's computer, ticket-on-demand manufacturing information which the user inputs, to the user's computer, the ticket-on-demand image creating unit creates image information of a ticket on demand corresponding to the ticket-on-demand manufacturing information, and stores the created image information so as to be associated with the user information and the information related to the advance ticket.

Further, when receiving, from the user's computer, the ticket-on-demand manufacturing information which includes information requesting to add, to the image of the ticket on demand, a user image, which is a predetermined image that is stored in the user's computer, the ticket-on-demand image creating unit 905 receives the user image from the user's computer to create image information of the ticket on demand corresponding to the ticket-on-demand manufacturing information, and stores it so as to be associated with the user information or the information related to the reservation.

Furthermore, the ticket-on-demand image creating unit reads out the ticket layout information stored in the ticket layout database and provides the read information to the user's computer. Then, the ticket-on-demand image creating unit further receives information on the layout of a ticket on demand selected by the user from the ticket layout information and creates the image information of the ticket on demand so as to correspond to the layout of the ticket on demand.

Moreover, the ticket-on-demand image creating unit may read out performance content items related to the advance ticket from the performance item database and provide the read items to the user's computer.

Further, the ticket-on-demand image creating unit may read out a predetermined content related to the user from the member content database and provide the content to the user's computer.

When receiving the image information of the demand on ticket from a predetermined ticket issuing machine for issuing the advance ticket, a ticket-on-demand issuing unit 906 reads out the image information and provides the read information to the ticket issuing machine.

Figure 10:
FIG. 10 shows an example of a conventional ticket.

FIG. 10 shows an example of a conventional ticket. As shown in FIG. 10, no information on a ticket purchaser is included in the conventional ticket. That is, the conventional ticket does not include contents of the ticket purchaser (for example, information on various memorial days, a purchaser's avatar image, and a purchaser's photograph).

Figure 11A:
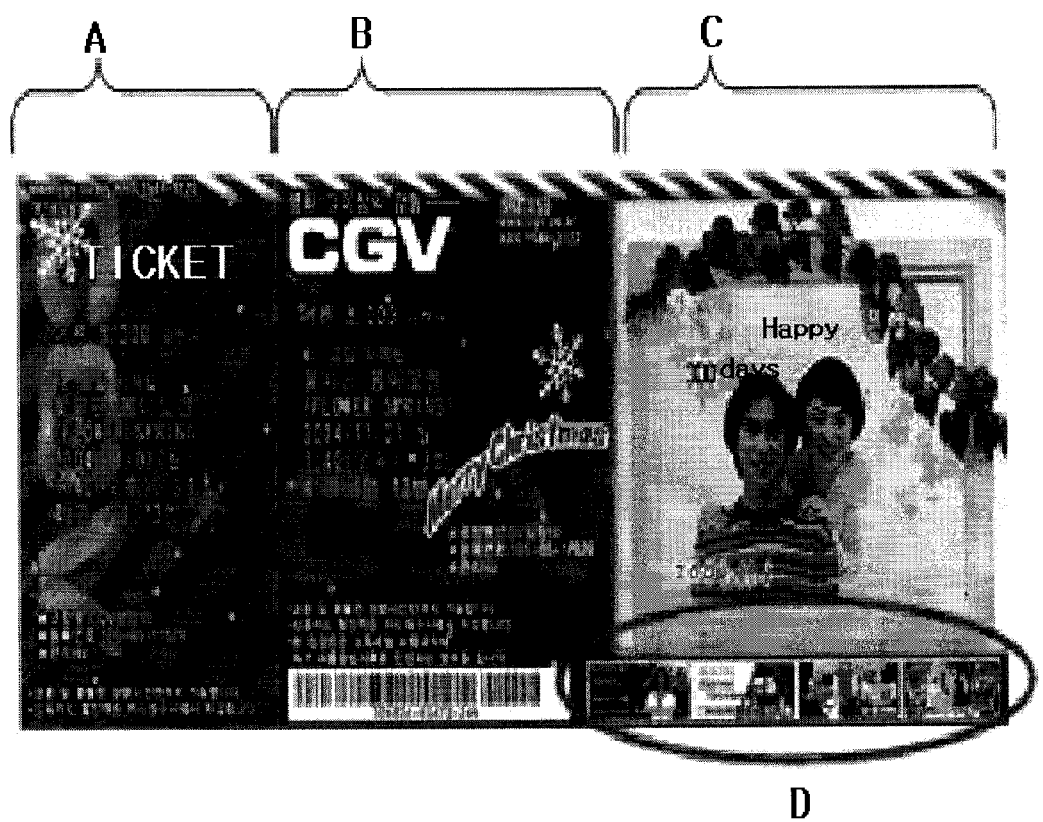
FIGS. 11a and 11b show examples of tickets on demand manufactured according to the invention.
Figure 11B:

FIGS. 11a and 11b show examples of tickets on demand according to the invention. FIG. 11a shows a ticket on demand having a horizontal layout. In FIG. 11a, a character A denotes a cut portion that is cut off at the time of entrance to a performance place. Information required for the service provider to collect statistics of, for example, the number of audiences and the sales is recorded in the cut portion. A character B denotes a ticket information portion, and information on a performance (for example, the title of the performance, the date and time of the performance, and a seat number) is written on the ticket information portion. In addition, the purchaser can change the background of the ticket information portion.

Further, a character C denotes an image processing portion. Each purchaser can edit information and images to be printed in the image processing portion. The purchaser can form a desired image on the image processing portion and adds desired texts thereto using his own images or a movie content image database.

Furthermore, a character D denotes an advertisement content portion. The service provider can print an advertisement image on a predetermined portion of the ticket, if necessary.

Moreover, FIG. 11b shows another example of the ticket on demand manufactured according to the invention. That is, the ticket shown in FIG. 11b is of a vertical layout type. The purchaser can select one of the horizontal and vertical layout types when purchasing a ticket, which makes it possible to manufacture various tickets on demand. In FIG. 11b, the information printed on the ticket on demand is the same as that shown in FIG. 11a.

Figure 12:
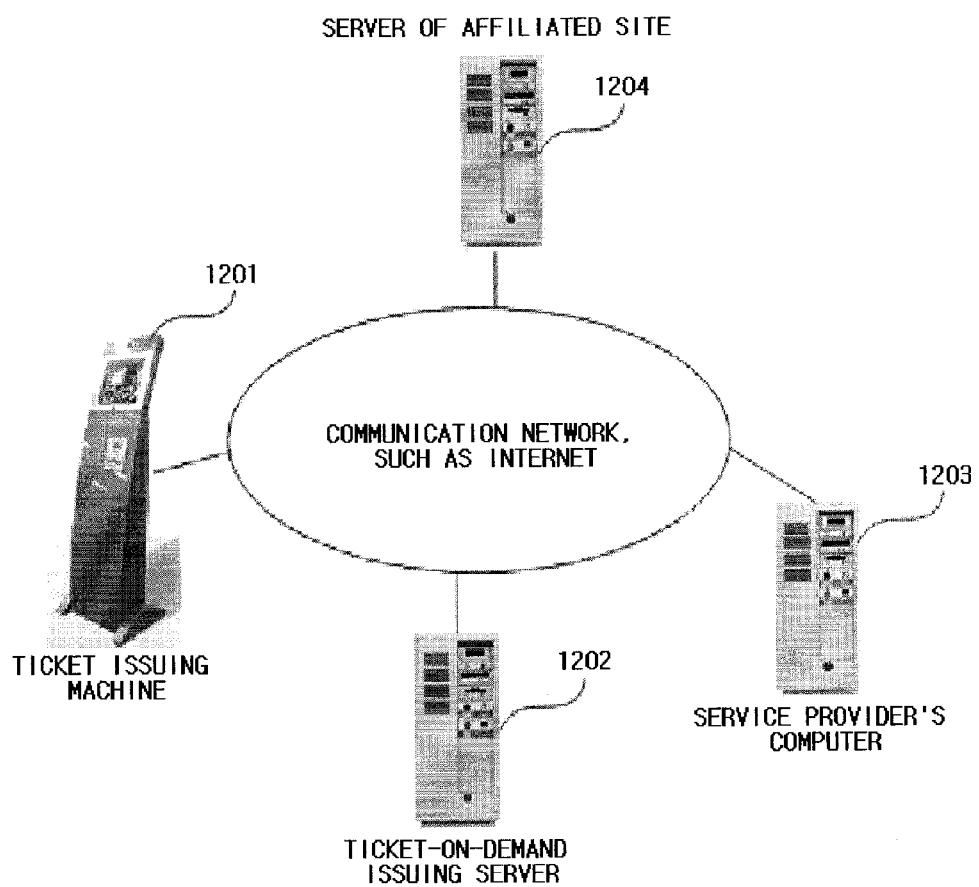
FIG. 12 is a diagram illustrating the overall structure of a system for issuing a ticket on demand according to another embodiment of the invention.

FIG. 12 is a diagram illustrating the overall structure of a ticket-on-demand issuing system according to another embodiment of the invention.

A ticket issuing machine 1201 receives information of a performance (information on an issuable ticket) provided from a ticket-on-demand issuing server 1202, various image contents corresponding to the performance, contents of each member that are stored in the ticket-on-demand issuing server by a ticket purchaser who is registered therein as a member, and predetermined contents provided from an affiliated site (another Internet site) 1204. Then, ticket issuing machine edits and issues the ticket in response to operational information input by a user.

A service provider's computer 1203 provides information on a performance (information on an issuable ticket) and an image content source corresponding to the performance to the ticket-on-demand issuing server 1202.

Figure 13:
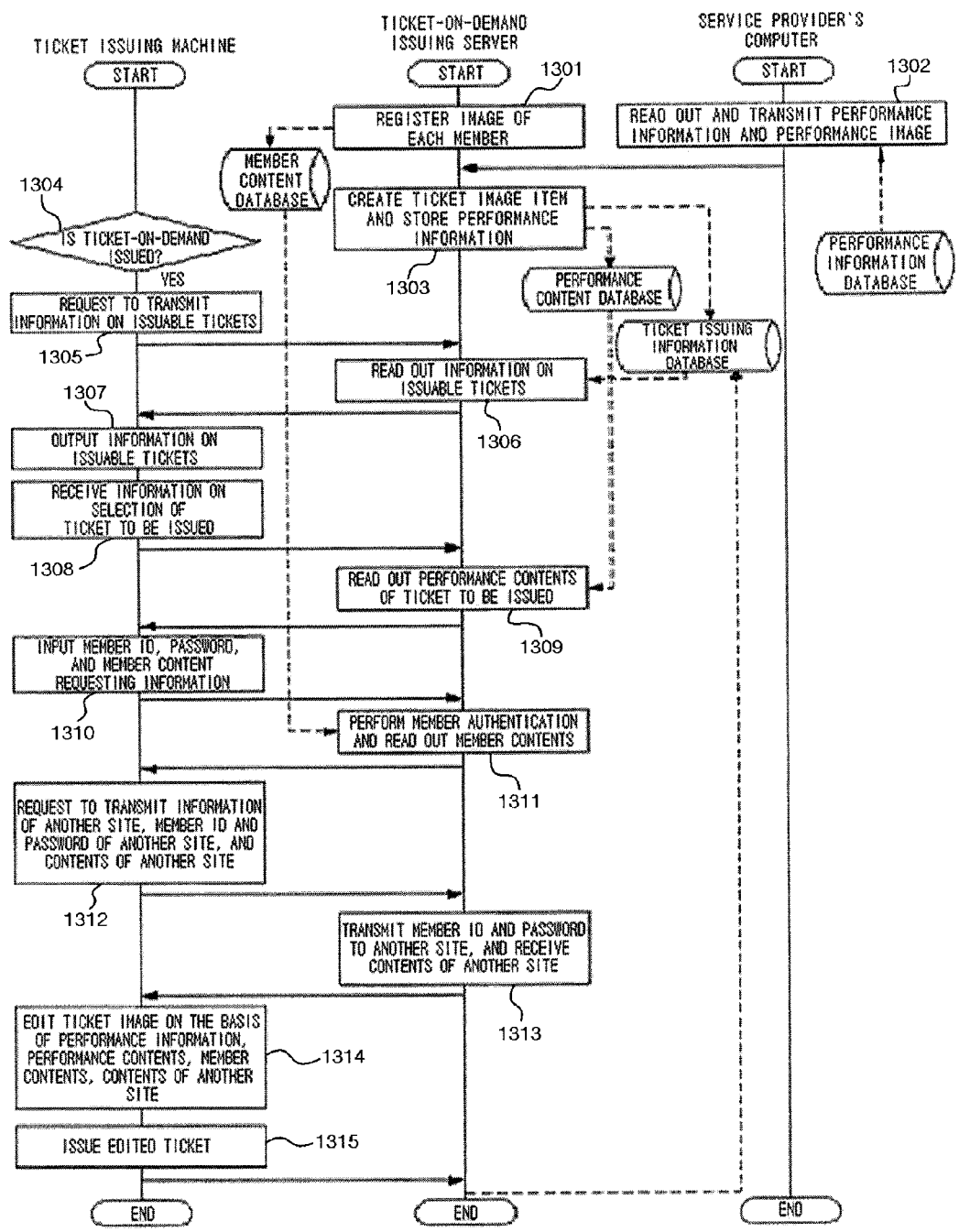
FIG. 13 is a flow chart illustrating a preferred example of a method of issuing a ticket on demand according to still another embodiment of the invention.

FIG. 13 is a flow chart illustrating a method of issuing a ticket on demand according to still another embodiment of the invention.

First, when users who will purchase tickets in the near future join in the ticket-on-demand issuing server as members, the ticket-on-demand issuing server registers contents of each member, and stores them, thereby establishing a member content database (1301).

A service provider's computer reads out performance information and image stored therein (1302) and transmits them to the ticket-on-demand issuing server. Then, the ticket-on-demand issuing server stores the performance information in a ticket issuing information database to manage information on issuable tickets. In addition, the ticket-on-demand issuing server divides the performance image to create a ticket image item, and stores it in a performance content database (1303).

Meanwhile, when receiving a ticket purchaser's request to issue a ticket on demand (1304), the ticket issuing machine requests the ticket-on-demand issuing server to transmit information on issuable tickets (1305).

Then, the ticket-on-demand issuing server searches the ticket issuing information database to read out the information on issuable tickets (1306), and transmits the information to the ticket issuing machine.

The ticket issuing machine outputs the received information on issuable tickets (1307) and provides it to the ticket purchaser. Then, when the ticket purchaser selects one (ticket) of the output ticket information items (1308), the ticket issuing machine transmits information on the selected ticket to the ticket-on-demand issuing server.

Then, the ticket-on-demand issuing server reads out the content of a performance corresponding to the ticket to be issued from the performance content database (1309) and transmits the read content to the ticket issuing machine.

Further, when the ticket purchaser, which is a member of the ticket-on-demand issuing server, inputs his or her ID, password, and member content request information to the ticket issuing machine (1310), the ticket issuing machine transmits these information items to the ticket-on-demand issuing server. Then, the ticket-on-demand issuing server performs member authentication on the basis of the received member ID and password. As a result, when the member authentication succeeds, the ticket-on-demand issuing server searches the member content database to read out member contents corresponding to the member ID, and transmits them to the ticket issuing machine.

Further, in a case in which the ticket purchaser wants to edit a ticket on demand by using predetermined contents of another Internet site in which the purchaser also joins as a member, when the ticket purchaser inputs, to the ticket issuing machine, information of another Internet site (for example, domain information) and information, such as his member ID and password registered in another Internet site (1312), the ticket issuing machine transmits these information items to the ticket-on-demand issuing server. At that time, the ticket-on-demand issuing server transmits the member ID and password of the ticket purchaser to another Internet site and requests the Internet site to transmit predetermined contents corresponding to the member ID. When receiving the contents from the Internet site, the ticket-on-demand issuing server transmits the contents to the ticket issuing machine (1313).

The ticket issuing machine edits a ticket image on the basis of performance contents. However, when the member contents exist or contents are stored in another Internet site, the ticket issuing machine may edit a ticket image such that these contents are added to the ticket (1314).

Next, the ticket issuing machine issues the edited ticket to the ticket purchaser (1315), and transmits information on the issue of the ticket to the ticket-on-demand issuing server. Then, the ticket-on-demand issuing server stores the received information on the issue of the ticket in the ticket issuing information database.

In this method, the processes 1301 and 1310 to 1313 are not indispensable, but are optional.

Figure 14:
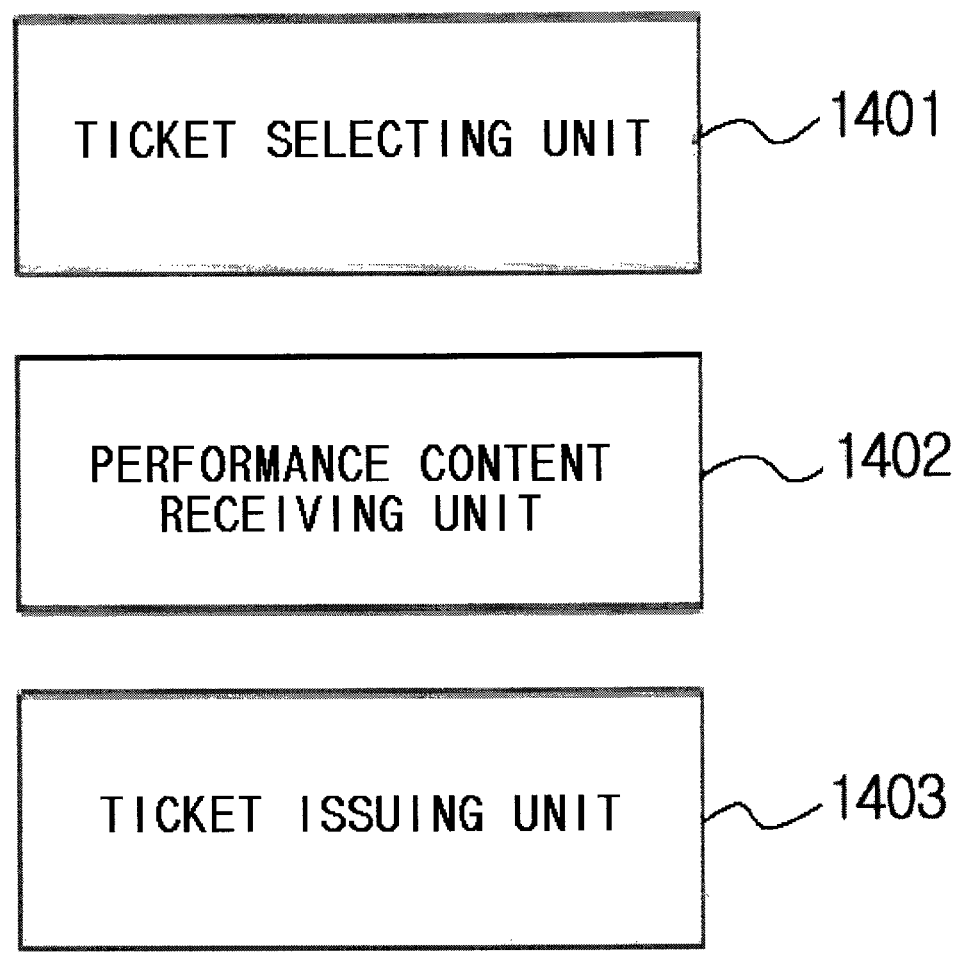
FIG. 14 is a block diagram illustrating a preferred example of a ticket issuing machine of a system of issuing a ticket on demand according to yet another embodiment of the invention.

FIG. 14 is a block diagram illustrating a preferred example of a ticket issuing machine of a ticket-on-demand issuing server according to yet another embodiment of the invention. The ticket issuing machine according to this embodiment includes a ticket selecting unit 1401, a performance content receiving unit 1402, and a ticket issuing unit 1403.

When a ticket purchaser inputs information requesting to issue a ticket on demand to the ticket selecting unit 1401, the ticket selecting unit requests the ticket-on-demand issuing server to transmit information on issuable tickets. When receiving the information on issuable tickets from the ticket-on-demand issuing server, the ticket selecting unit outputs the information. Then, the ticket purchaser selects one of the output information items on issuable tickets.

Further, the performance content receiving unit 1402 receives information of the selected ticket from the ticket selecting unit, and requests the ticket-on-demand issuing server to transmit performance contents related to the selected ticket.

The ticket issuing unit 1403 receives performance information of the selected ticket and the performance contents from the ticket selecting unit and the performance content receiving unit, respectively, and edits a ticket on demand, on the basis of these information items, to issue the edited ticket.

When the ticket purchaser inputs his or her member ID and password to the performance content receiving unit 1401, the performance content receiving unit transmits the information to the ticket-on-demand issuing server, and then receives contents corresponding to the member ID of the purchaser. At that time, the ticket issuing unit 1403 receives performance information of the selected ticket from the ticket selecting unit, and further receives the performance contents and the member contents from the performance content receiving unit. Then, the ticket issuing unit edits a ticket on demand, on the basis of the received information items, and issues the edited ticket.

The performance content receiving unit 1401 of the ticket issuing machine receives information of another Internet site, a member ID, and a password from the ticket purchaser and transmits the information to the ticket-on-demand issuing server. Then, the ticket-on-demand issuing server transmits the member ID and password to a server of another Internet site and requests the server to transmit contents corresponding to the member ID. The ticket-on-demand issuing server receives the contents from the server of another Internet site. Then, the ticket issuing unit 1403 receives performance information of the selected ticket from the ticket selecting unit, and further receives the performance contents and the contents of another Internet site from the performance content receiving unit. Then, the ticket issuing unit edits a ticket on demand, on the basis of the received information items, and issues the edited ticket.

Although the embodiments of the invention have been described above, the invention is not limited to the above-mentioned embodiments, but various modifications and changes of the invention can be made without departing from the spirit and scope of the invention.

Meanwhile, the methods of the invention can be performed by a computer executable program. In addition, the computer executable program can be recorded on a computer readable medium (for example, a hard disk and various memories).

INDUSTRIAL APPLICABILITY

According to the present invention, it is possible for users to purchase, for example, movie, theater, and concert tickets in advance over a communication network, such as the Internet, to edit their own tickets, and to receive the edited tickets from a ticket issuing machine. In addition, it is possible for the users to add their avatars to the issued tickets.

Further, a service provider, which is an Internet site in charge of providing a ticket reservation service, can make profits by creating and selling avatars or items that to be added to performance tickets.

Furthermore, when directly purchasing performance tickets at a ticket office in addition to purchasing them in advance by using an advance reservation system, the purchasers can have their own distinctive tickets by using their own images that have been previously registered.

The invention claimed is:

1. A method of issuing a ticket on demand by using a ticket-on-demand issuing server that is connected to a user's computer used for a user to purchase a performance ticket in advance and a service provider's computer used for a service provider to issue the ticket over a communication network including the Internet and that purchases the ticket in advance in response to a user's request, wherein the ticket-on-demand issuing server performs the steps of:

(a) receiving, from the service provider's computer, information on a ticket to be sold including at least one of a performance place, a performance time, a seat number, and price information of a performance to establish a for-sale ticket information database;

(b) receiving image information of the ticket to be sold, dividing the image information into a plurality of images, and converting the divided images into items to establish a ticket image item database;

(c) performing, when the user's computer accesses the ticket-on-demand issuing server over the communication network, user authentication, and, when the user authentication fails, allowing the user to join therein as a member through a member joining procedure and permitting the access of the user's computer;

(d) providing, to the user's computer, information on available tickets registered in the for-sale ticket information database and performing an advance reservation when the user's computer selects at least one of the available tickets;

(e) reading out, when receiving a request to manufacture a ticket on demand from the user's computer, contents required for manufacturing the ticket on demand from the items established in the ticket image item database and providing the read contents to the user's computer;

(f) receiving, from the user's computer, ticket-on-demand manufacturing information including a request to add, to an image of the ticket on demand, a user image, which is a predetermined image that is stored in the user's computer by the user, creating image information of a ticket on demand corresponding to the ticket-on-demand manufacturing information, and storing the image information so as to be associated with user information or information related to the advance reservation; and (g) reading out, when a ticket issuing machine for issuing advance tickets requests the ticket-on-demand issuing server to transmit the image information of the ticket on demand, the image information and providing the read image information to the ticket issuing machine;

wherein, in the step (b), when a predetermined ticket on demand is manufactured, the ticket-on-demand issuing server further establishes a ticket layout database by receiving ticket layout information in which a plurality of positions where images are printed on the ticket are previously set and by storing the information, and the ticket-on-demand issuing server further establishes a member content database by receiving, from the user's computer, a predetermined content stored in the user's computer and by storing the predetermined content, and in the step (b), the ticket-on-demand issuing server further performs the steps of:

(b1) receiving, from the user's computer, log-in information, including a user ID and a password, required for the user to log in a predetermined Internet site that provides an avatar service to the user who is a member of the Internet site; and (b2) transmitting the log-in information to an avatar server, which is a server for managing the Internet site, receiving, from the avatar server, an avatar image of the member, and storing the avatar image in the member content database, the step (e) includes a step of reading out the ticket layout information from the ticket layout database and of providing the read information to the user's computer, and the ticket-on-demand issuing server reads out a predetermined content related to the user from the member content database and provides the read content to the user's computer, and the step (f), the ticket-on-demand issuing server further receives, from the user's computer, information on the layout of a ticket on demand selected by the user from the ticket layout information to create image information of the ticket on demand so as to correspond to the layout of the ticket on demand.

2. The method of issuing a ticket on demand according to claim 1, wherein, in the step (f), when receiving, from the user's computer, the ticket-on-demand manufacturing information including a request to add, to an image of the ticket on demand, a user image, which is a predetermined image that is stored in the user's computer by the user, the ticket-on-demand issuing server receives the user image from the user's computer to create image information of a ticket on demand corresponding to the ticket-on-demand manufacturing information, and stores it so as to be associated with the user information or the information related to the advance reservation.

3. The method of issuing a ticket on demand according to claim 1, wherein, in the step (b) the ticket-on-demand issuing server further establishes a performance content item database by receiving, from the service provider's computer, performance contents including a pamphlet image of the performance, by dividing the pamphlet image into a plurality of images, by converting the divided images into items, and by storing the items, and in the step (e), the ticket-on-demand issuing server reads out performance content items related to the advance ticket from the performance content item database and provides the read items to the user's computer.

4. The method of issuing a ticket on demand according to claim 1,
wherein, in the step (b2), the ticket-on-demand issuing server further performs the steps of:
receiving, from the avatar server, a predetermined avatar image sold by the avatar server:
providing the avatar image to the user's computer;
receiving, from the user's computer, a user's request to purchase the avatar image and payment information required for purchasing the avatar image:
providing the information to the avatar server; and
storing the avatar image in the member content database.

5. A ticket-on-demand issuing server computer that is connected to a User's computer used for a user to purchase a performance ticket in advance and a service Provider's computer used for a service provider to issue the ticket over a communication network including the Internet and that purchases the ticket in advance in response to a user's request, comprising:
a for-sale ticket information managing unit that receives, from the service provider's Computer, information on a ticket to be sold including at least one of a performance place, a performance time, a seat number, and price information of the performance to establish a for-sale ticket information database;
a content managing unit that receives image information of the ticket to be sold, divides the image information into a plurality of images, and converts the divided images into items to establish a ticket image item database;
a member managing unit that, when the user's computer accesses the ticket-on-demand issuing server over the communication network, performs user authentication, and, when the user authentication fails, allows the user to join therein as a member through a member joining procedure to permit the access of the user's computer;
a ticket reserving unit that provides, to the user's computer, information on available tickets registered in the for-sale ticket information database and that, when the user's computer selects at least one of the available tickets, performs an advance reservation;
a ticket-on-demand image creating unit that, when receiving a request to manufacture a ticket on demand from the user's computer, reads out contents required for manufacturing the ticket on demand from the items established in the ticket image item database and provides the read contents to the user's computer, and that, when receiving, from the user's computer, ticket-on-demand manufacturing information which includes a request to add, to an image of the ticket on demand, a user image, which is a predetermined image that is stored in the user's computer by the user, creates image information of a ticket on demand corresponding to the ticket-on-demand manufacturing information, and stores the image information so as to be associated with user information or information related to the advance reservation: and
a ticket-on-demand issuing unit that, when a ticket issuing machine for issuing advance tickets requests the ticket-on-demand issuing server to transmit image information of the ticket on demand, reads out the image information and provides the read image information to the ticket issuing machine;
wherein, when a predetermined ticket on demand is manufactured, the content managing unit further establishes a ticket layout database by receiving ticket layout information in which a plurality of positions where images are printed on the ticket are previously set and by storing the information and a member content database by receiving, from the user's computer, a predetermined content stored in the user's computer and by storing the predetermined content, and the content managing unit receives, from the user's computer, log-in information, including a user ID and a password, required for the user to log in a predetermined Internet site that provides an avatar service to the user who is a member of the Internet site; transmits the log-in information to an avatar server, which is a server for managing the Internet site; receives, from the avatar server, an avatar image of the member; and stores the avatar image in the member content database, and
the ticket-on-demand image creating unit reads out the ticket layout information from the ticket layout database and provides the read information to the user's computer, further receives, from the user's computer, information on the layout of a ticket on demand selected by the user from the ticket layout information to create image information of the ticket on demand so as to correspond to the layout of the ticket on demand and reads out a predetermined content related to the user from the member content database and provides the read content to the user's computer.

6. The ticket-on-demand issuing server according to claim 5,
wherein, when receiving, from the user's computer, the ticket-on-demand manufacturing information including a request to add, to an image of the ticket on demand, a user image, which is a predetermined image that is stored in the user's computer by the user, the ticket-on-demand image creating unit receives the user image from the user's computer to create image information of a ticket on demand corresponding to the ticket-on-demand manufacturing information, and stores it so as to be associated with the user information or the information related to the advance reservation.

7. The ticket-on-demand issuing server according to claim 5, wherein the content managing unit further establishes a performance content item database by receiving, from the service provider's computer, performance contents including a pamphlet image of the performance, by dividing the pamphlet image into a plurality of images, by converting the divided images into items, and by storing the items, and
the ticket-on-demand image creating unit reads out performance content items related to the advance ticket from the performance content item database and provides the read items to the user's computer.

8. The ticket-on-demand issuing server according to claim 5,
wherein the content managing unit further performs the steps of:
receiving, from the user's computer, log-in information, including a user ID and a password, required for the user to log in a predetermined Internet site that provides an avatar service to the user who is a member of the Internet site;
transmitting the log-in information to an avatar server, which is a server for managing the Internet site:
receiving, from the avatar server, a predetermined avatar image sold by the avatar server;
providing the avatar image to the user's computer;
receiving, from the user's computer, a user's request to purchase the avatar image and payment information required for purchasing the avatar image;
providing the information to the avatar server; and
storing the avatar image in the member content database.

* * * * *